United States Patent
Vibbert

(10) Patent No.: US 11,068,769 B2
(45) Date of Patent: Jul. 20, 2021

(54) SECURE NFC TAG SERVICE POINT MESSAGING SYSTEM

(71) Applicant: Service Point Systems LLC, Everett, WA (US)

(72) Inventor: Mitchell Vibbert, Everett, WA (US)

(73) Assignee: Service Point Systems LLC, Everett, WA (US)

(*) Notice: Subject to any disclaimer, the term of this patent is extended or adjusted under 35 U.S.C. 154(b) by 0 days.

(21) Appl. No.: 16/881,321

(22) Filed: May 22, 2020

(65) Prior Publication Data
US 2021/0042599 A1   Feb. 11, 2021

Related U.S. Application Data

(60) Provisional application No. 62/884,615, filed on Aug. 8, 2019.

(51) Int. Cl.
*G06K 19/077*   (2006.01)
*G06Q 30/00*    (2012.01)
*G06Q 30/02*    (2012.01)
*H04B 5/00*     (2006.01)

(52) U.S. Cl.
CPC ....... *G06K 19/07716* (2013.01); *G06Q 30/01* (2013.01); *G06Q 30/0261* (2013.01); *H04B 5/0025* (2013.01)

(58) Field of Classification Search
CPC .. G06K 19/07716; H04W 4/50; H04W 4/029; H04W 4/02; H04W 5/0056; H04B 5/00; G06Q 30/01; G06Q 30/0261
See application file for complete search history.

(56) References Cited

U.S. PATENT DOCUMENTS

| | | | |
|---|---|---|---|
| 9,240,006 B2* | 1/2016 | White | G06Q 50/12 |
| 9,264,846 B2 | 2/2016 | Stromberg et al. | |
| 9,984,394 B2 | 5/2018 | Fonzi et al. | |
| 10,032,144 B1 | 7/2018 | Jacob et al. | |
| 10,152,706 B2 | 12/2018 | Caceres et al. | |
| 2010/0082485 A1 | 4/2010 | Lin et al. | |
| 2013/0052952 A1 | 2/2013 | Fisher | |
| 2014/0114776 A1* | 4/2014 | Solanki | H04W 4/02 |
| | | | 705/15 |
| 2015/0302413 A1 | 10/2015 | Dua | |
| 2016/0300198 A1 | 10/2016 | Guido et al. | |
| 2017/0116447 A1* | 4/2017 | Cimino | H04L 9/0631 |
| 2018/0109508 A1* | 4/2018 | Wall | H04L 9/0822 |

* cited by examiner

*Primary Examiner* — Laura A Gudorf
(74) *Attorney, Agent, or Firm* — Karthik Murthy; Murthy Patent Law PLLC

(57) ABSTRACT

A system, comprising a prepared Near Field Communication (NFC) tag, which has been customized by a business to cause custom websites to pop up on customers' smartphones; a service point, which is a place where a customer will receive service from the business; wherein a customer can waive a smartphone over the prepared NFC tag at a service point; wherein the prepared NFC tag will cause a website to pop up on the smartphone and the customer can enter a request, which will be sent to workers at the business's location; wherein the customer's request is authenticated and hence physical presence verified; wherein workers at the business will receive the request, and will respond to the request at the customer's service point. For example, in a grocery store, the service points are along the aisles, and in a restaurant, the service points are the tables.

14 Claims, 14 Drawing Sheets

| Time | Service Point | Message |
|---|---|---|
| 12:56 | C1 | missing a fork |
| 12:55 | B8 | ready for the check |
| 12:54 | D4 | Need ketchup |
| 12:52 | A3 | will have another glass of wine |
| 12:51 | D2 | we've had a spill |
| 12:38 | D1 | need some boxes |
| 12:37 | B5 | Ready for dessert |
| 12:33 | C4 | more coffee |
| 12:28 | A7 | A glass has broken |

FIG. 3

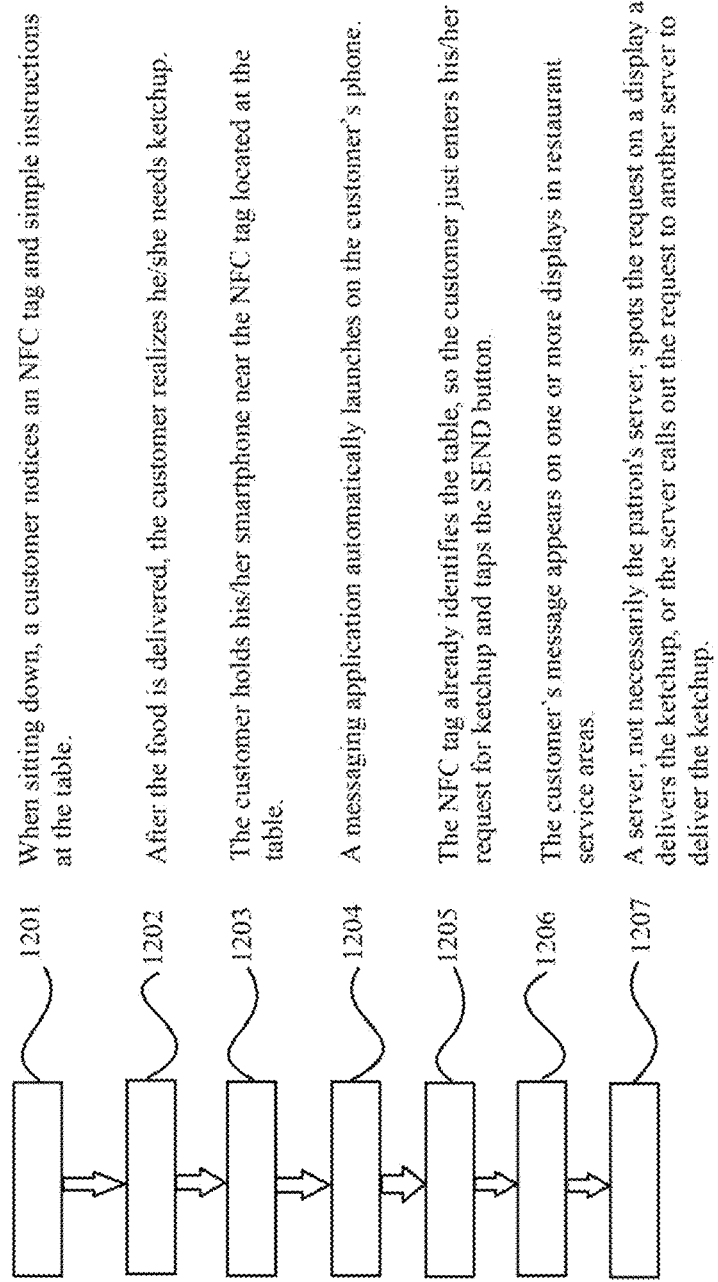

SECURE NFC TAG SERVICE POINT MESSAGING SYSTEM

FIELD OF THE INVENTION

The present invention relates to a service point messaging system utilizing NFC tags.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties Such as concentration, reaction conditions, and so forth, used to describe and claim certain embodiments of the invention are to be understood as being modified in some instances by the term "about."

Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an and" the includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "Such as") provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any Such inclusion or deletion occurs, the specification is herein deemed to contain the group as modified thus fulfilling the written description of all Markush groups used in the appended claims.

Today, customers in a restaurant have to wait for a waiter or waitress to come to their table in order for the customer to communicate with the waiter or waitress. This can result in customers who wait too long to pay their bill, because the customer cannot communicate that they are finished with their meal. It can also result in a customer who changes their mind about what to order, but is not able to reach a waiter or waitress in time, and so the customer receives an item they did not want.

Also, sometimes a waiter or waitress is far away from the table they originally took orders from, and the customer has to wait a long time for the waiter or waiter to return.

SUMMARY

The present invention solves these issues, because the present invention allows for immediate contact with all restaurant staff. This allows for changes in orders, additional orders, and requests for additional items such as ketchup or salt, to be communicated immediately to the restaurant staff. Furthermore, since all restaurant staff will receive the message, the closest staff member can bring the item to the customer, maximizing efficiency. The customer also does not need to wait for a bill, because the customer can communicate when they are finished with their meal.

This is all accomplished through a system utilizing secure Near field communication (NFC) tags, smartphones, the internet, and software to coordinate the system. In one embodiment of the invention, a customer waves their smartphone over the NFC tag at their table, which pulls up a prompt on their smartphone. The customer is then able to communicate whatever they want to the restaurant staff, such as orders, or a request for a waiter or waitress, or any other request. The restaurant staff will have setup the system such that they can identify the table requesting the service based on the NFC tag that was used to create the prompt for the customer. As such, the closest restaurant staff to the customer can handle the request, further increasing efficiency.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 3 is a drawing of SPMSv1.0 Message Monitor Application according to various embodiments of the present disclosure.

FIG. 12 displays the workflow for a restaurant service request.

DETAILED DESCRIPTION

Figure 1A:
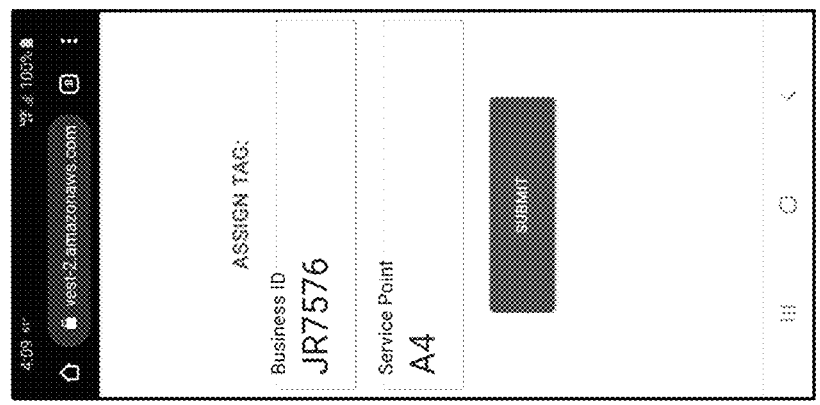
FIG. 1A is a drawing of SPMSv1.0 Tag Assignment Application according to various embodiments of the present disclosure.

Various embodiments of the present disclosure relate to providing a Secure NFC Tag Service Point Messaging System, hereafter called the "Service Point Messaging System or "SPMS" for short. SPMSv1.0 refers to one embodiment of the present invention, which is a real-world implementation of SPMS.

Utilizing secure Near-Field Communication (NFC) tag technology, SPMS is intended for businesses or government agencies employing human (or even non-human) hosts, staff, servers or attendants to serve customers at specific physical locations (service points). An example of such a business is a restaurant, where the service point is the table. By holding a smartphone near an NFC tag at the service point, SPMS allows a customer to send messages to service staff to expedite service. Below is one example of how it would work at a restaurant:

1. When sitting down, a customer notices the NFC tag and basic instructions at the table.

2. After the food is delivered, the customer realizes he needs ketchup.

3. The customer holds his smartphone for a second or two near the NFC tag located at the table.

4. A messaging application automatically launches on the customer's phone. Because the application is web-based and is launched using the smartphone's built-in NFC support, there is no application that needs to be downloaded or installed.

5. The NFC tag identifies the table, so the customer just enters his request for ketchup and taps the SEND button.

6. The customer's message appears on one or more displays in restaurant service areas. In SPMSv1.0, new requests are highlighted for a configurable period of time.

7. A server spots the request on a display and delivers the ketchup, or the server calls out the request to another server to deliver the ketchup. In SPMSv1.0, once service is underway, a server can tap the request on any display to mark as resolved.

The SPMS can also be utilized in movie theaters, hospitals, and airlines are other businesses that have service points.

A more general step by step explanation of how SPMS works in a restaurant is as follows:

1. When sitting down, a customer notices the NFC tag and basic instructions at the table.

2. The customer provides their order to a waiter or waitress.

3. After the food or drink is delivered, the customer realizes he needs an additional item.

4. The customer holds his smartphone for a second or two near the NFC tag located at the table.

5. A messaging application automatically launches on the customer's phone. Because the application is web-based and is launched using the smartphone's built-in NFC support, there is no application that needs to be downloaded or installed.

6. The NFC tag identifies the table, so the customer just enters his request for the additional food or drink that he wants, and then taps the SEND button.

7. The customer's message appears on one or more displays in restaurant service areas. In SPMSv1.0, new requests are highlighted for a configurable period of time.

8. A server spots the request on a display and delivers the additional item, or the server calls out the request to another server to deliver the additional item. In SPMSv1.0, once service is underway, a server can tap the request on any display to mark as resolved.

An alternative general step by step explanation of how SPMS works in a restaurant is as follows:

1. When sitting down, a customer notices the NFC tag and basic instructions at the table.

2. The customer holds his smartphone for a second or two near the NFC tag located at the table.

3. A messaging application automatically launches on the customer's phone. Because the application is web-based and is launched using the smartphone's built-in NFC support, there is no application that needs to be downloaded or installed.

4. The NFC tag identifies the table, so the customer just enters his request for the food and/or drink that he wants, and then taps the SEND button.

5. The customer's message appears on one or more displays in restaurant service areas. In SPMSv1.0, new requests are highlighted for a configurable period of time.

6. A server spots the request on a display and delivers the food and/or drink, or the server calls out the request to another server to deliver the food and/or drink. In SPMSv1.0, once service is underway, a server can tap the request on any display to mark as resolved.

7. The process repeats as needed, based on the desires of the customer.

The waiters or waitresses can be either humans or robots, because a robot would also be able to receive messages, interpret those messages, and deliver food, drink or other items. The robot would have the location of all the tables as well.

Advantages and Benefits

1. When compared to other possible methods of notifying service staff, SPMS provides a number of advantages and benefits:
2. For most modern smartphones, nothing needs to be downloaded or installed by the customer.
3. The customer does not need to navigate to/within an app, enter a URL, or enter any error-prone numbers or codes. The customer just enters the message and sends.
4. Compared to ringing a bell or raising a flag at a service point, SPMS does not require an attendant to first visit the service point to know the request, thereby saving time for both the customer and the attendant.
5. Because SPMS messages can be seen by the entire service staff at once, it's possible for requests to be serviced by the optimal attendant at a given moment, saving time for both customers and attendants.
6. As compared to some other methods, SPMS is discreet, avoiding embarrassment to the customer or business in case what the customer orders is considered embarrassing.
7. Compared to other possible approaches, service staff do not need to fumble with phones or other devices while serving customers.
8. Unlike popular messaging apps, no personal information is exchanged or permanent connectivity established between customers and attendants.
9. Because an NFC tag is physically present, SPMS is able to precisely identify the service point location in contrast to attempts based on Global Positioning System (GPS) technology which does not have the necessary precision and can fail indoors. Indeed, the US government currently claims that civilian GPS horizontal accuracy is 4 meters, and for higher confidence it is 7.8 meters. This distance is too large to accurately identify a table in a restaurant, and therefore GPS would not succeed in the goal of identifying a table in a restaurant.
10. Nothing bulky and/or potentially expensive to purchase and maintain needs to be installed at each service point. NFC tags are small, inexpensive, and can be replaced easily.
11. SPMS prevents spoofing by using secure NFC tags. Other potential solutions that do not rely on secure NFC (including non-secure NFC tags) can allow non-customers outside of the establishment to send fraudulent service requests.

Secure NFC Tag Technology

SPMS depends on secure NFC tag technology. NFC tag technology allows information to be stored in inexpensive tags that can be affixed or placed almost anywhere. The tags have many form factors including small, around-one-inch-in-diameter stickers and hard wallet-sized cards. Information in tags can be read (scanned) by dedicated NFC readers or by NFC-capable smartphones. Most modern smartphones sold in the United States are NFC-capable.

A URL to a website can be stored in an NFC tag. Smartphones detecting a URL in a tag automatically launch or offer to launch the URL in a mobile browser. SPMSv1.0 employs this feature to automatically take the customer to the browser-based messaging application.

URLs stored on tags are static, so the URL value does not change with each tag read. While this works for many applications, it does not work for SPMS. If the URL does not change with each tag read, then anyone at any time could later invoke the URL to send service requests, whether they are a customer or not. To prevent this problem and to uniquely identify a tag and its service point, SPMS takes advantage of new secure NFC tags (such as the NXP NTAG 424 DNA) that can be configured to automatically inject a dynamic authentication code and other information into the URL each time the tag is read. The dynamic authentication code is checked for verification in the cloud (in one embodiment, this could be AWS), and if correct, then the customer's request is displayed on the server's display. If the dynamic authentication code is found to be incorrect, then the customer's request is never displayed in the server's display. In this fashion, SPMS ensures only customers at valid service points can send service requests.

In one embodiment of the invention, the NFC tag has an NTAG213 chip and is based on ISO/IEC 14443A standard with 144 bytes of memory. This tag comes blank white with printable surface for customization and can be encoded multiple times or locked for one-time programmable applications.

In one embodiment of the invention, the NXP NTAG 424 DNA tags use a state-of-the-art secure authentication chip, providing security, privacy, and trust for Internet of Things applications while providing the most efficient method of digitally connecting products. The new tags leverage the native security mechanism within the attack-resistant certified chip and are designed for use in secure Internet of Things applications, including anti-counterfeiting for brand protection, document authentication, secure supply chain traceability (i.e., product origin and provenance), authorized data access, and trusted customer engagement, including loyalty programs. The tag can be encoded multiple times or locked for one-time programmable applications.

In another embodiment of the present invention, a user can move any portable computing device over a NFC tag, and a URL will pop up on the portable computing device. This portable computing device can be either a smartphone, or any other device that has a processor, memory, storage, a user interface, an internet connection, and the ability to interact with NFC tags.

In one embodiment of the present invention, when a customer makes a request through the customer's portable computing device, then the request is authenticated and hence physical presence of the customer at the service point associated with the scanned NFC tag is verified. In another embodiment of the invention, the prepared NFC tags are secured, the customer's request is authenticated and hence physical presence verified, by automatically injecting a dynamic authentication code into the URL each time the prepared NFC tag is read. The dynamic authentication code is checked for verification in the cloud, and if correct, then the customer's request is displayed on the server's display. If the dynamic authentication code is found to be incorrect, then the customer's request is never displayed to the worker at the business.

Business ID

When setting up the system for a new business, the business must be assigned a unique ID for the business to use the software. The SPMS administrator and a business representative would agree on the ID value before assigning it. User names and password are also assigned to individual business employees. When launching the message monitor application, the business employee must enter the business ID, username, and password. Usernames don't have to be globally unique since they are associated with the business ID (which is unique). In the Tag Assignment application, only the business ID is currently required because the tags have already been provisioned internally with a secret key so the tags will only work for that business. If a different business tried to enter the same business ID, it would not work since the secret keys in the tags and in the database would not agree. In the Tag Assignment application it would be possible to also ask for a username and password in addition to the business ID, but in this implementation it was not done for ease-of-use in a hectic restaurant environment where every second is critical for server personnel.

Provisioning SPMSv1.0

Before SPMSv1.0 can be used by a business, the following provisioning tasks are performed:

1. An SPMS administrator enters the business ID, business name, prompt text, and a secret key into the configuration tables of a SPMS database.

2. A SPMS administrator provides a set of secure NFC tags to the business. Each tag contains the secret key for the business and the URL to the SPMS mobile web application. The tags can take different physical forms depending on the preferences of the business. The SPMS mobile web application is the application that launches on a user's phone upon scanning an NFC tag. The SPMS mobile web application is "mobile" because it runs on a mobile phone. The SPMS mobile web application is a "web" application since the application is launched and runs in the phone's browser. This is unlike a native phone app downloaded from the Apple or Google stores.

3. For each service point of the business, using a smartphone an employee scans an unassigned tag. When a tag is scanned, the URL is automatically launched and the employee is taken to the tag assignment portion of the SPMS web application. The employee enters the business ID and service point identifier (e.g. "B3" for table 3 in section B) and submits to assign the tag to the service point.

4. Each assigned tag is located or affixed to something at its service point. For tags affixed to something portable, it is recommended that the service point identifier be written on the tag or on the item the tag is affixed to.

Architecture

This section describes the architecture of SPMS. SPMS can be broken down into three logical applications: a tag assignment application, a mobile messaging application, and a message monitor application. In SPMSv1.0, for technical convenience, the tag assignment and mobile messaging applications are bundled inside a single web application.

Tag Assignment Application

The tag assignment application allows staff to assign unassigned tags to service points. In SPMSv1.0 when a staff member scans an unassigned tag with her smartphone, the tag assignment application launches automatically with no prior software installation or configuration required. The staff member enters the business ID and service point identifier and submits to assign the tag. The software verifies the business ID and tag are valid and saves the assignment in the SPMS database. Screenshots of the SPMSv1.0 tag assignment application are in FIGS. 1a and 1b:

FIG. 1a. SPMSv1.0 Tag Assignment Application

Figure 1B:
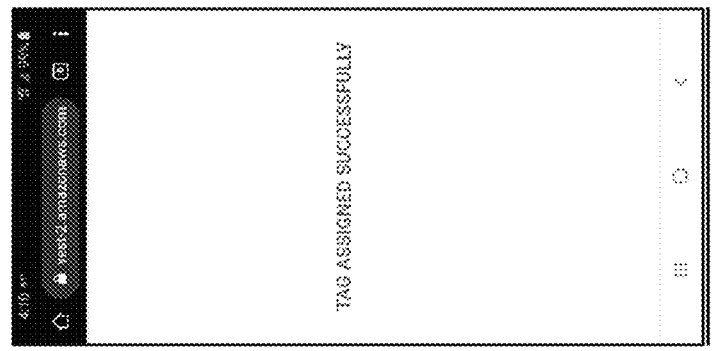
FIG. 1B is a drawing of SPMSv1.0 Tag Assignment Application according to various embodiments of the present disclosure.

FIG. 1b. SPMSv1.0 Tag Assignment Application

Mobile Messaging Application

Figure 2A:
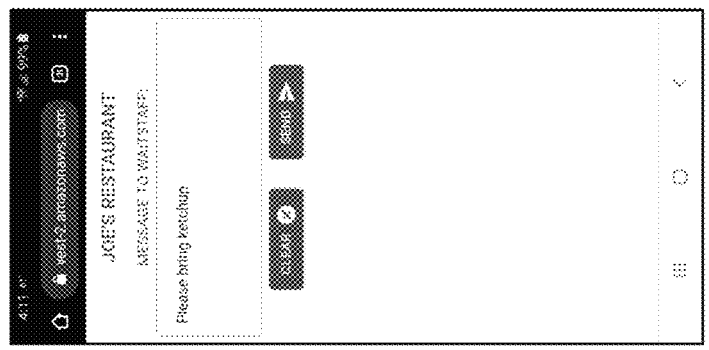
FIG. 2A is a drawing of SPMSv1.0 Mobile Messaging Application according to various embodiments of the present disclosure.

When an assigned tag is scanned with a smartphone by a customer at a service point, the mobile messaging application is launched. With SPMSv1.0, no prior software installation or configuration is normally required by the customer. From the earlier assignment of the tag to the business and service point, the name of the business and a custom message prompt are presented to the user. The customer enters a message and taps SEND. The software performs additional validation of the tag before writing the message to the SPMS database. Screenshots of the SPMSv1.0 mobile messaging application are in FIGS. 2a and 2b below. In FIG. 2A, the text "MESSAGE TO WAITSTAFF:" is the custom prompt text that a business can customize. In FIG. 2A, the text "JOE's RESTAURANT" is the business name. In another embodiment of the invention, any portable computing device that functions with NFC can be used instead of a smartphone.

FIG. 2a. SPMSv1.0 Mobile Messaging Application

Figure 2B:
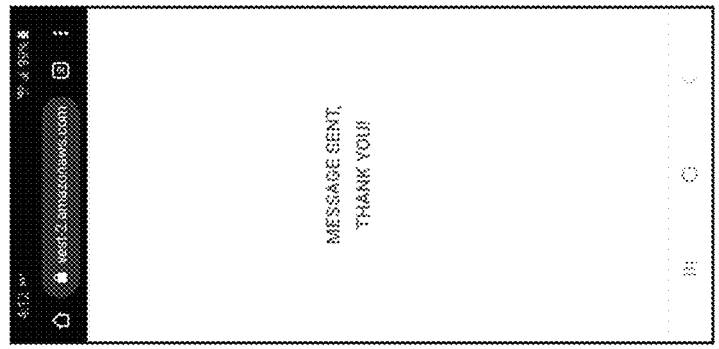
FIG. 2B is a drawing of SPMSv1.0 Mobile Messaging Application according to various embodiments of the present disclosure.

FIG. 2b. SPMSv1.0 Mobile Messaging Application

Figure 6:
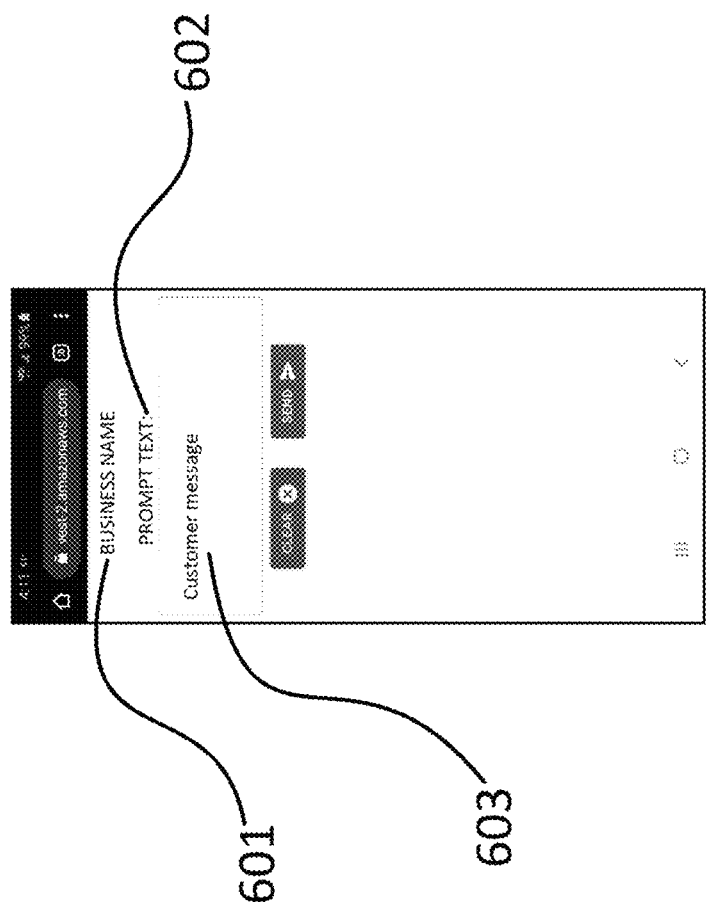
FIG. 6 is a drawing of a generalized version of FIG. 2A.

FIG. 6 is a generalized version of FIG. 2a, showing where the business name 601 is displayed, where the prompt text 602 is displayed, and where the customer message 603 is displayed.

Message Monitor Application

The message monitor application lets service staff see incoming customer requests. The message monitor application can be run and viewed in multiple areas of an establishment. In SPMSv1.0, the monitor application UI runs in a portable computing device browser though an SPMS monitor application could also be implemented for other types of displays and devices including mobile pagers. In SPMSv1.0, newly arrived messages are highlighted for a short period of time.

Service staff can touch a message on a display to mark as resolved. Messages marked as resolved will appear as resolved on all instances of the monitor application. FIG. 3 is a screenshot of the SPMSv1.0 message monitor application. In one embodiment of the present invention, newly arrived messages are pink and resolved messages are green. In another embodiment of the present invention, the user may choose a preset color for newly arrived messages, and the user may choose a preset color for resolved messages.

FIG. 3. SPMSv1.0 Message Monitor Application

SPMSv1.0 Architecture

Figure 4:
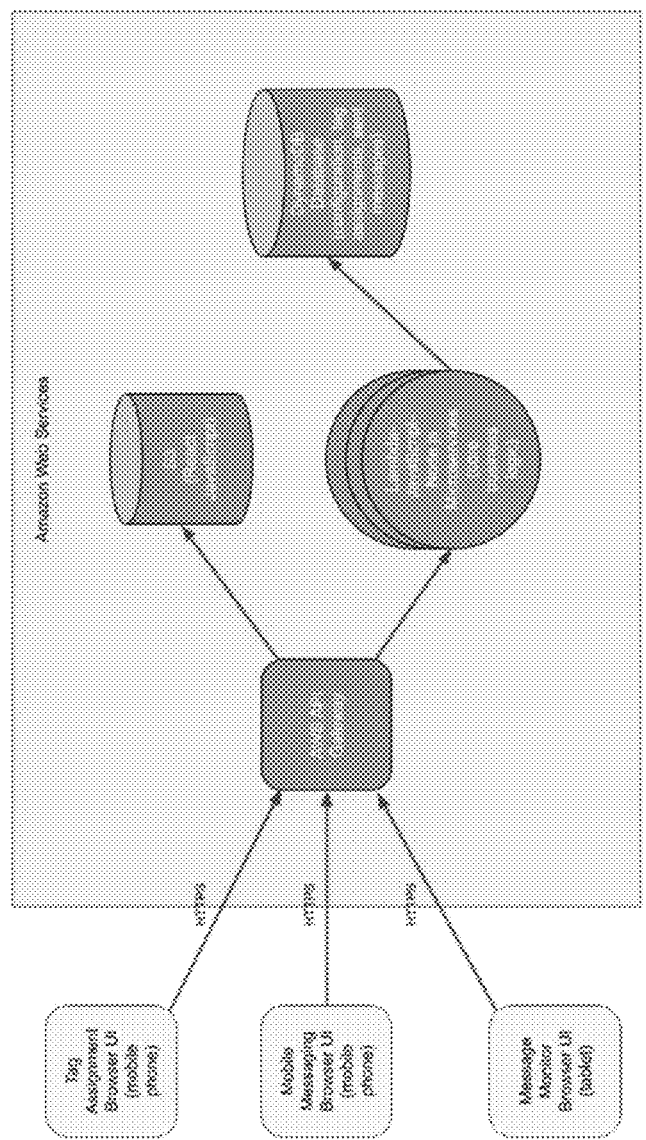
FIG. 4 is a drawing of SPMSv1.0 Architecture according to various embodiments of the present disclosure.

In one embodiment of the present invention, SPMSv1.0 has been implemented and is currently operational in the Amazon Web Services Cloud. FIG. 4 shows the architecture.

FIG. 4. SPMSv1.0 Architecture

In one embodiment of the present invention, the user interfaces (UI's) for the tag assignment, mobile messaging, and message monitor applications are built using JavaScript, React.js and Material-UI. From the browser, the UI's make HTTPS calls to the AWS API Gateway which in turn invokes business logic contained in AWS Lambda functions written in JavaScript/Node.js and Java. The AWS DynamoDB database contains configuration, tag assignments, and sent messages. The following are some of the tasks performed by the Lambda functions:

1. Check whether a tag scan is valid.
2. Check whether a tag has been assigned.
3. Assign a tag to a service point in the database.
4. Post a new message to the database.
5. Create a message monitor user session.
6. Retrieve recent messages from the database.

S3 is an object (file) store with an HTTP interface, and S3 can store any type of file. In one embodiment of the invention, S3 is used to store the HTML and Javascript files comprising the user interface of the application. React is a Javascript library for building user interfaces.

In one embodiment of the invention, the business logic in AWS Lambdas performs tasks like reading and writing to the database, assigning tags to locations (e.g. tables), validating tags (when scanned), formatting data for display, updating message status, exporting data for analytics, etc.). AWS Lambda is beneficial because unlike other technologies it requires very little administration, which is important for small sized companies and startups. In another embodiment of the invention, the business logic could be implemented using another type of server technology, and the Lambda functions could be implemented on another server platform.

In one embodiment of the invention, DynamoDB is beneficial because it's low cost and requires almost no administration. In another embodiment of the invention, another online database can be utilized for configuration, tag assignments, and sent messages.

Figure 7:
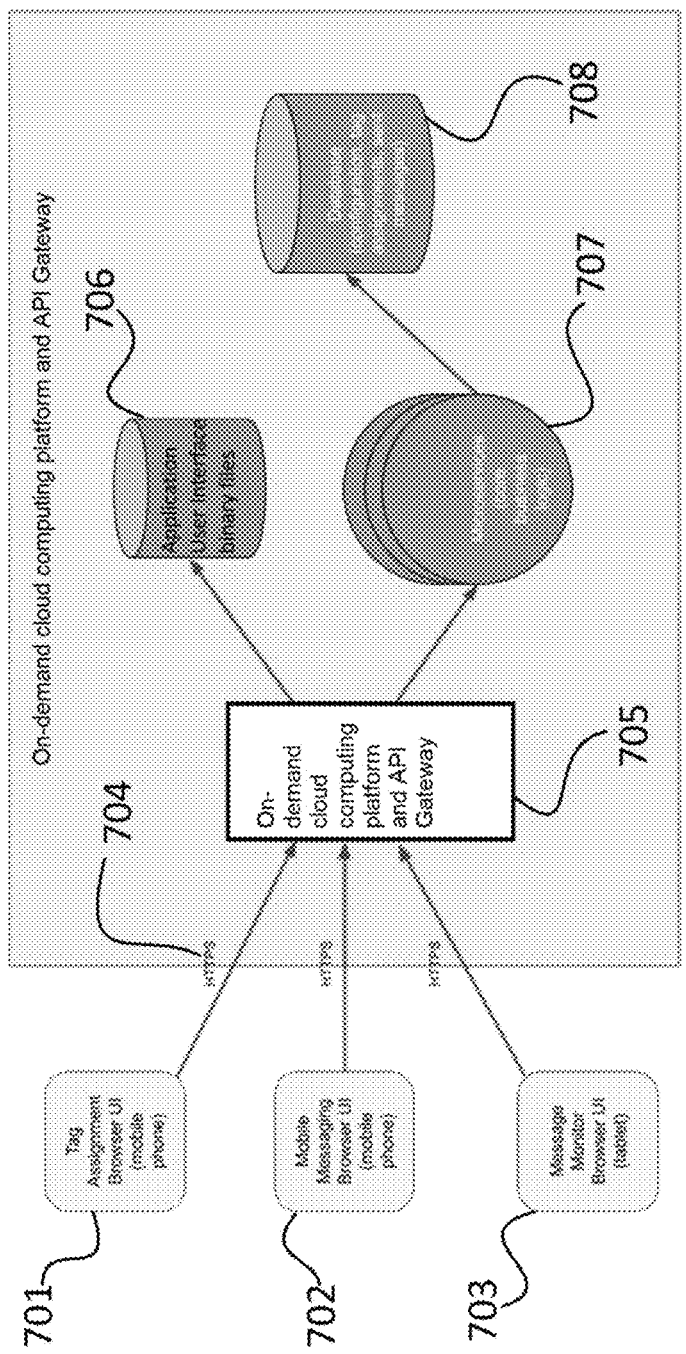
FIG. 7 is a drawing of a generalized version of FIG. 4.

FIG. 7 shows a generalized version of FIG. 4.

In one embodiment of the invention, Tag assignment browser UI (mobile phone) 701, or Mobile messaging browser UI (mobile phone) 702, or Message monitor browser UI (any portable computing device) send data online securely to the on-demand cloud computing platform and API gateway 705. Then the on-demand cloud computing platform and API gateway 705 sends data to the Application User Interface binary files 706. The on-demand cloud computing platform and API gateway 705 also sends data to microservices (core business logic) 707. From there, the microservices (core business logic) 707 sends data to the database (configuration, tag assignments, sent messages) 708.

In another embodiment of the invention, the tag assignment browser user interface 701, mobile messaging browser user interface 702, and message monitor browser user interface 703, utilize each of their respective browsers to make HTTPS calls 704 to the on-demand cloud computing platforms and API Gateway 705, which in turn invokes business logic contained in Microservices 707. Microservices 707 then sends the database 708 the following material: configuration, tag assignments, and sent messages.

The on-demand cloud computing platform and API gateway 705 also sends files to the Application User Interface Binary files 706.

In another embodiment of the invention, when a tag is scanned, the browser (e.g. Chrome) on the mobile phone is launched with a URL. It's as if you started the browser on your phone and typed a URL, but instead this happens automatically. The URL goes to the API Gateway which in turn goes to S3 and what is retrieved is an HTML file and a bunch of Javascript from S3. The browser on the phone displays the HTML and runs the Javascript returned from S3.

In another embodiment of the invention, the tag assignment, mobile messaging, and message monitor applications are web applications written in HTML and Javascript. The tag assignment, mobile messaging, and message monitor applications sit on S3 until a browser retrieves and runs them. The UI's are simply that portion of the HTML and Javascript running in the browser that interacts with the user. The UI and web applications are almost the same thing, except that the application includes not only what you see in the browser but also the calls to the back-end and the code on the back-end.

In another embodiment of the invention, a restaurant table does not have a service point, instead the table is the service point. The NFC tag can be affixed anywhere on the table or onto something that normally sits on the table.

SPMSv1.0 Scan Logic

Figure 5:
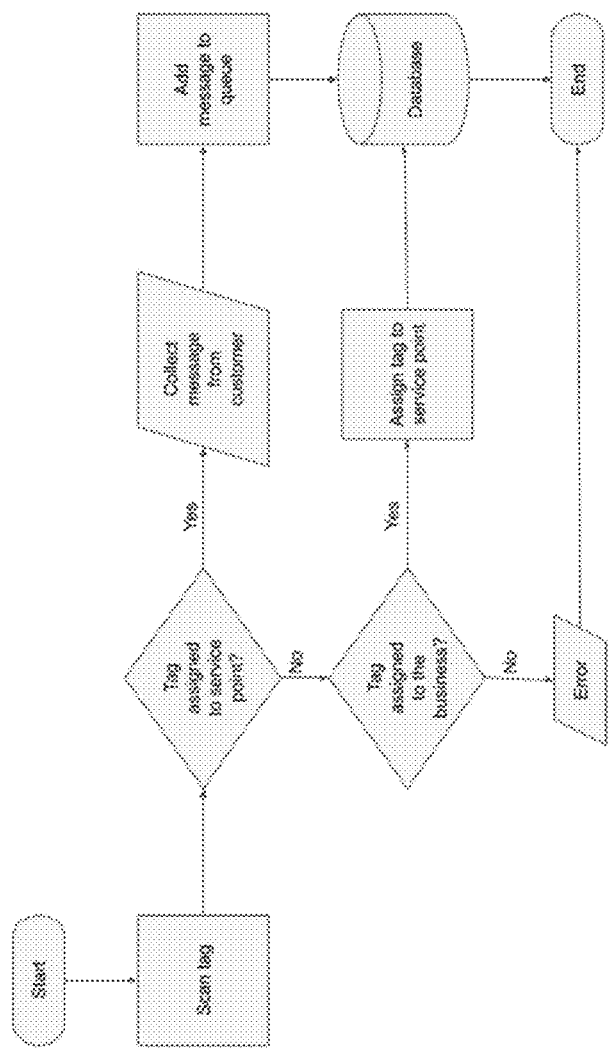
FIG. 5 is a drawing of SPMSv1.0 Tag Scan Logic according to various embodiments of the present disclosure.

The flowchart in FIG. 5 depicts SPMSv1.0 system logic when an NFC tag is scanned:

FIG. 5. SPMSv1.0 Tag Scan Logic

Figure 8:
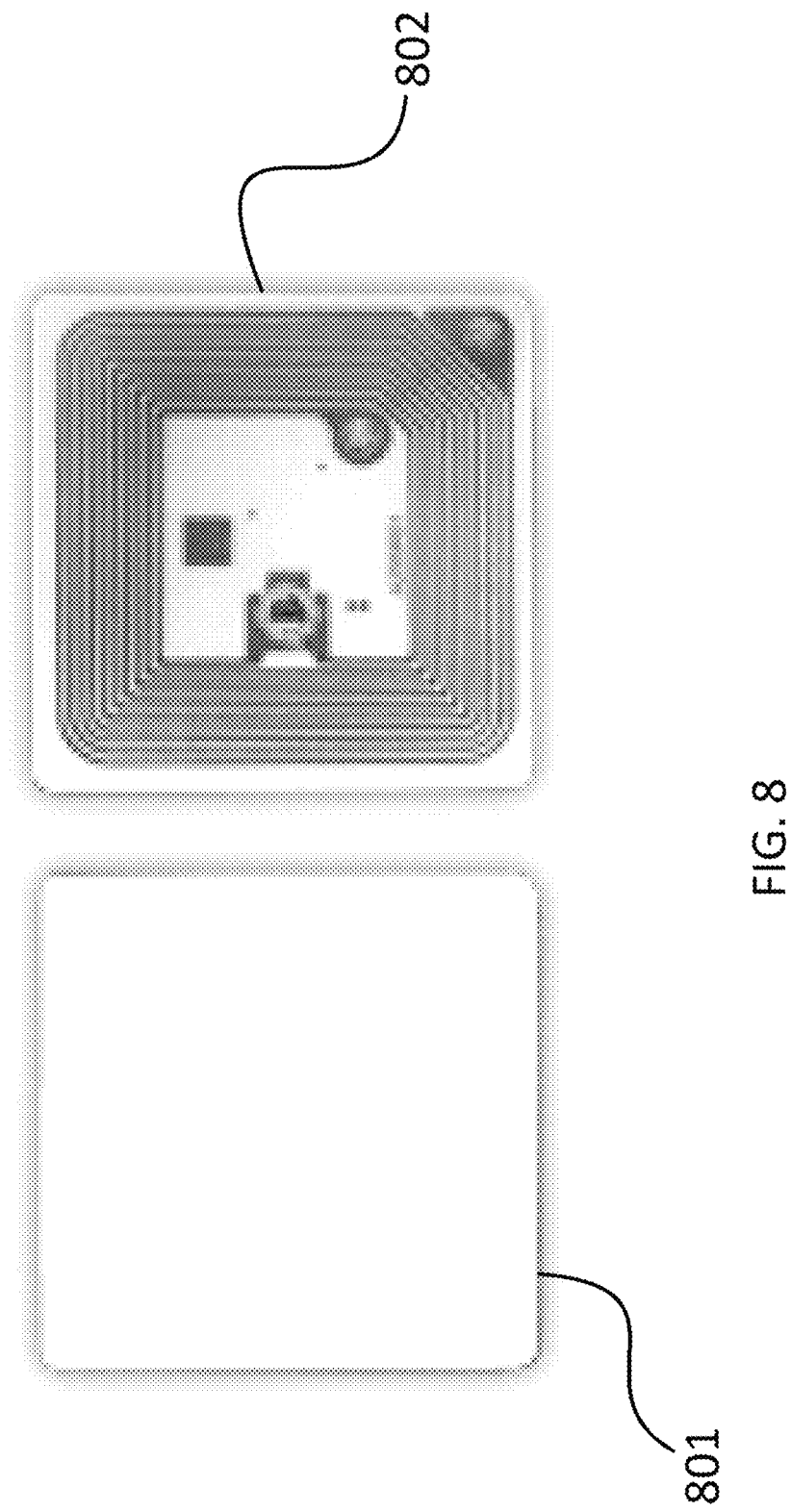
FIG. 8 is 2 images of a NFC tag, the front and the back.

FIG. 8 displays 2 images of a NFC tag, the front and the back.

The front 801 does not display anything. While the back 802 shows the parts of the NFC tag.

Figure 9:
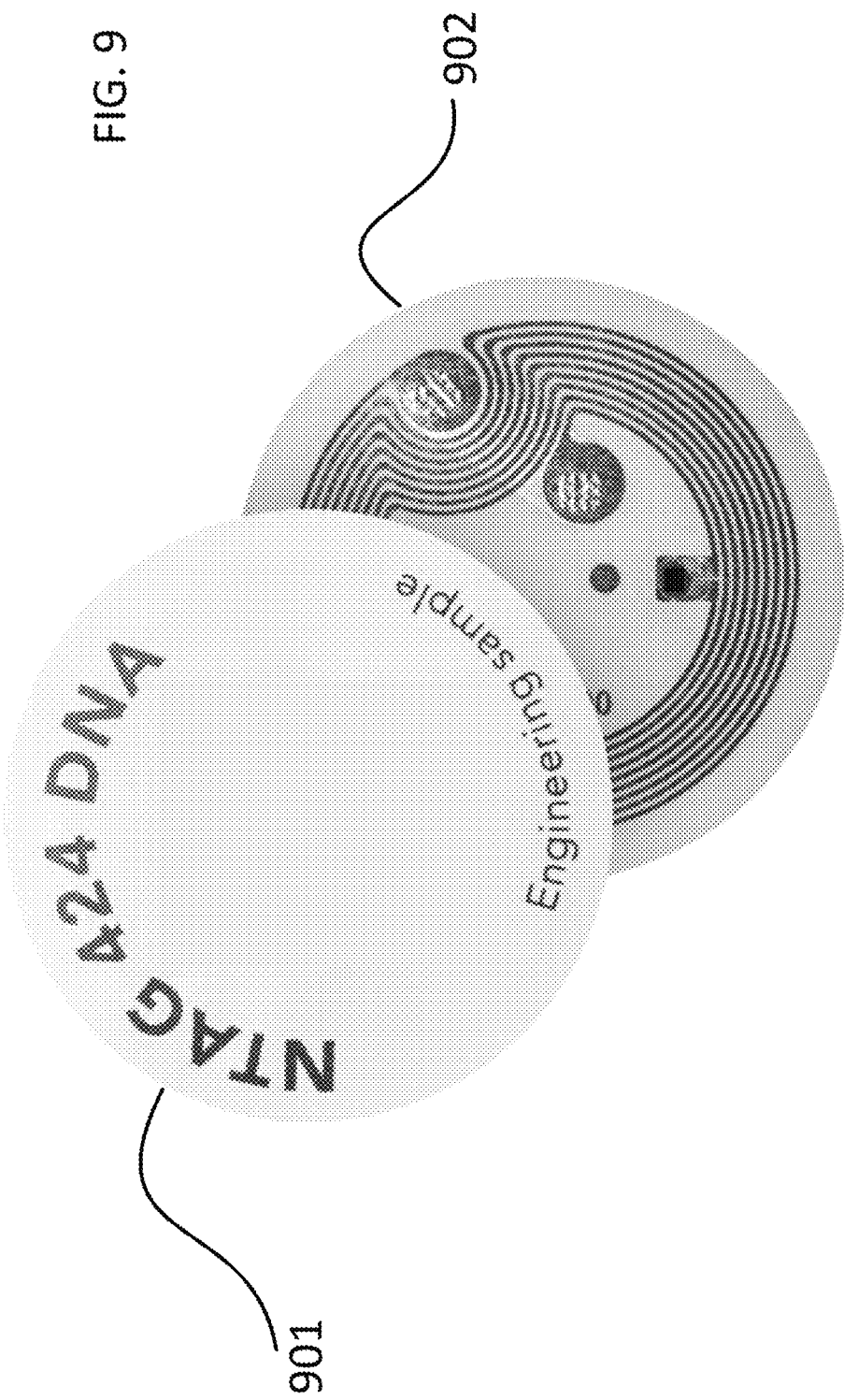
FIG. 9 is 2 images of a NXP NTAG 424 tag, the front and the back.

FIG. 9 displays 2 images of a NXP NTAG 424 tag, the front and the back.

The front 901 displays words relating to the manufacturer. While the back 902 shows the parts of the NXP NTAG 424.

FIG. 10

Figure 10:
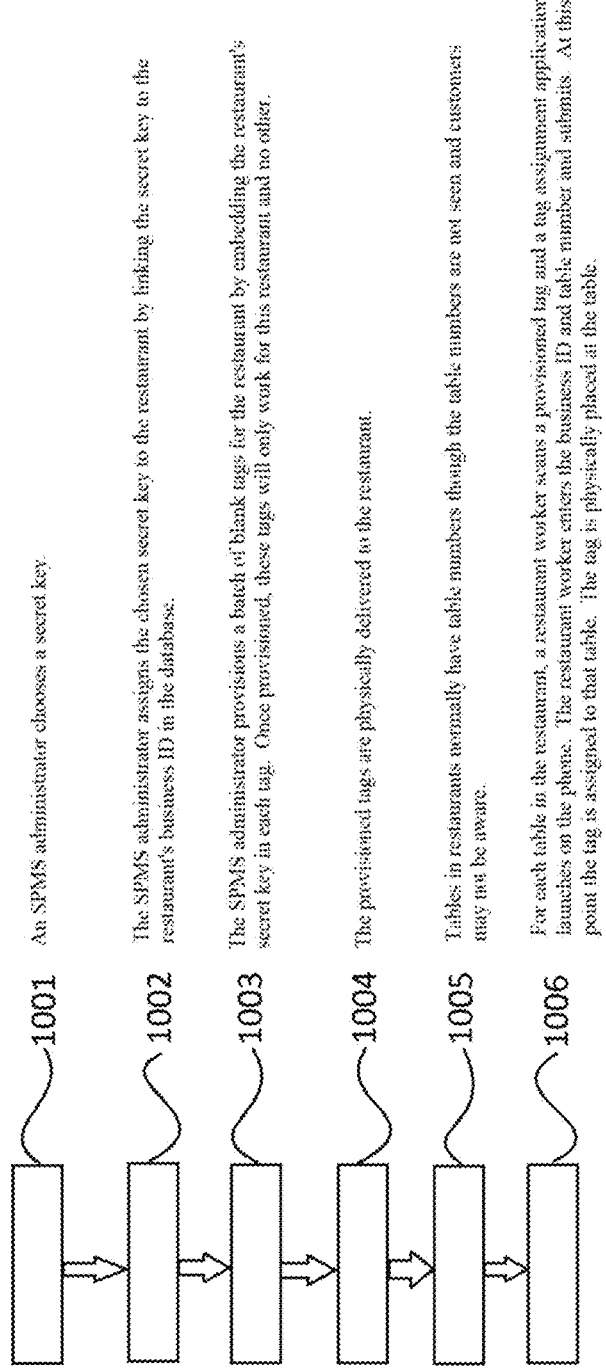
FIG. 10 is the workflow for the initial assignment of tags to tables at a restaurant.

In another embodiment of the invention, FIG. 10 displays the workflow for the initial assignment of tags to tables at a restaurant:

Step 1001: An SPMS administrator chooses a secret key.

Step 1002: The SPMS administrator assigns the chosen secret key to the restaurant by linking the secret key to the restaurant's business ID in the database.

Step 1003: The SPMS administrator provisions a batch of blank tags for the restaurant by embedding the restaurant's secret key in each tag. Once provisioned, these tags will only work for this restaurant and no other.

Step 1004: The provisioned tags are physically delivered to the restaurant.

Step 1005: Tables in restaurants normally have table numbers though the table numbers are not seen and customers may not be aware.

Step 1006: For each table in the restaurant, a restaurant worker scans a provisioned tag and a tag assignment application launches on the phone. The restaurant worker enters the business ID and table number and submits. At this point the tag is assigned to that table. The tag is physically placed at the table.

FIG. 11

Figure 11:
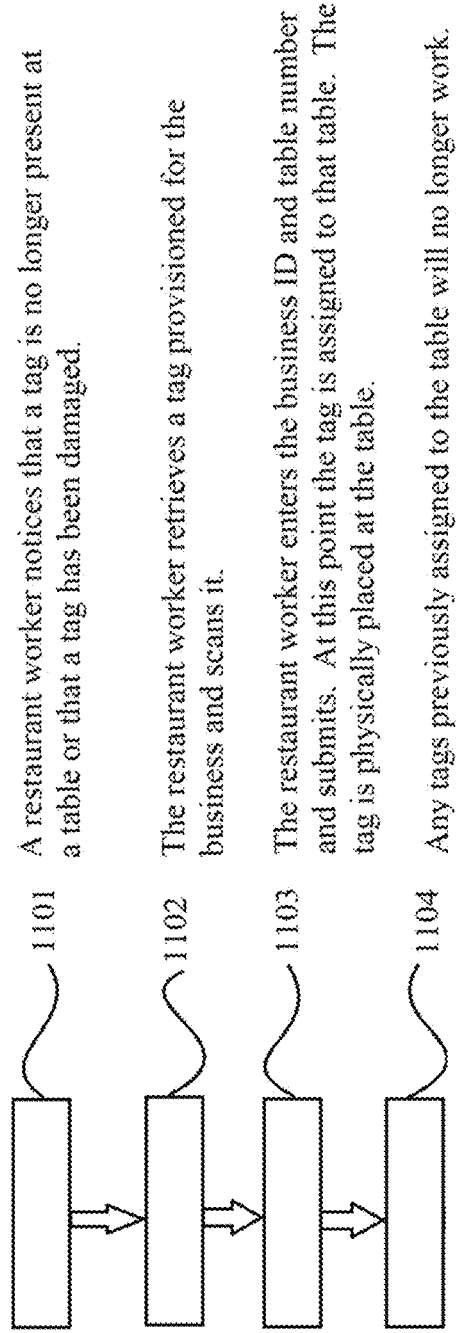
FIG. 11 displays the workflow for when a tag is damaged or stolen from a table.

In another embodiment of the invention, FIG. 11 displays the workflow for when a tag is damaged or stolen from a table:

Step 1101: A restaurant worker notices that a tag is no longer present at a table or that a tag has been damaged.

Step 1102: The restaurant worker retrieves a tag provisioned for the business and scans it.

Step 1103: The restaurant worker enters the business ID and table number and submits. At this point the tag is assigned to that table. The tag is physically placed at the table.

Step 1104: Any tags previously assigned to the table will no longer work.

FIG. 12

In another embodiment of the invention, FIG. 12 displays the workflow for a restaurant service request:

Step 1201: When sitting down, a customer notices an NFC tag and simple instructions at the table.

Step 1202: After the food is delivered, the customer realizes he/she needs ketchup.

Step 1203: The customer holds his/her smartphone near the NFC tag located at the table.

Step 1204: A messaging application automatically launches on the customer's phone.

Step 1205: The NFC tag already identifies the table, so the customer just enters his/her request for ketchup and taps the SEND button.

Step 1206: The customer's message appears on one or more displays in restaurant service areas.

Step 1207: A server, not necessarily the patron's server, spots the request on a display and delivers the ketchup, or the server calls out the request to another server to deliver the ketchup.

Business Benefits

SPMS delivers these business benefits:

1. Faster customer service, because the restaurant staff is immediately informed of any customer needs.

2. More efficient and effective use of staff, because the closest restaurant staff can take action, and because diners will not be waiting to pay their bill since they can immediately inform the restaurant staff when they want to pay their bill.

3. Happier customers, because they will always be able to immediately communicate to restaurant staff.

4. Happier (e.g. better-tipped) staff, because the customers will be happier, because the customers will be receiving better customer service.

5. More business, because happier customers will refer the restaurant to other customers, who will also patronize the restaurant.

6. Lower costs, because with increased efficiency, it's possible that less restaurant staff will be needed, and therefore costs for the restaurant will be lower.

SMPS could revolutionize personal service for everyone.

Example Use Cases

An example of one embodiment of the invention, is as follows: customers walk into a restaurant and are seated by a host, who hands the customers a menu. The customers decide on what to order, and then move a smartphone over a NFC tag on their table. This produces a prompt on the smartphone showing the business name of the restaurant, and a prompt saying "Message to waitstaff" and a text box. The customers write that they are ready to order into the text box and push send. The message from the customers appears on the restaurant's message monitor application. All of the waiters and waitresses sees the message, but only the closest waiter or waitress accepts it and heads to the table. The waiter or waitress arrives at the table, takes the customers' orders, and sends the orders to the kitchen. Once the food and drinks are ready, the waiter or waitress takes them to the customers, and the customers start eating. Then one customer realizes they need ketchup, so they move a smartphone over the NFC tag on their table, and enter "need ketchup" into the text box and pushes send. This message pops up on the message monitor application, and the nearest waiter or waitress accepts it, gets ketchup, and takes it to the customers. Eventually the customers finish eating and want to pay their bill, but no waiter or waitress comes over. So a customer moves a smartphone over the NFC tag on their table, and enters "ready to pay" into the text box and pushes send. Then a waiter or waitress comes over, takes payment, and the customers leave.

Another example of one embodiment of the invention is as follows: customers walk into a restaurant and are seated by a host, who hands the customers a menu. The customers decide on what to order, and then move a smartphone over a NFC tag on their table. This produces a prompt on the smartphone showing the business name of the restaurant, and a prompt saying "Message to waitstaff" and a text box. The customers write their orders into the text box and push send. The message from the customers appears on the restaurant's message monitor application. The restaurant staff inform the kitchen of the customers' orders, then once the food and drinks are ready, the restaurant staff bring the food and drink to the customers. As they are eating, a customer realizes they need hot sauce. The customer moves a smartphone over a NFC tag on their table, and enters "need hot sauce" into the text box and pushes send. The message from the customers appears on the restaurant's message monitor application. All of the waiters and waitresses see the message, but only the closest waiter or waitress accepts it, gets hot sauce, and heads to the table to give the customers hot sauce. Eventually the customers finish eating and want to pay their bill, but no waiter or waitress comes over. So a customer moves a smartphone over the NFC tag on their table, and enters "ready to pay" into the text box and pushes send. Then a waiter or waitress comes over, takes payment, and the customers leave.

Another example of one embodiment of the invention is as follows: customers walk into a restaurant and are seated by a robot host. The customers decide on what to order, and then move a smartphone over a NFC tag on their table. This produces a prompt on the smartphone showing the business name of the restaurant, and a prompt saying "Message to waitstaff" and a text box. The customers write their orders into the text box and push send. The message from the customers appears on the restaurant's message monitor application. The restaurant front staff is all robots, and the robots have received the same map of the tables in the restaurant as the message monitor application and the NFC tags, so the robots can identify a table and bring items to that table. A restaurant staff robot informs the kitchen of the customers' orders, then once the food and drinks are ready, a restaurant staff robot brings the food and drink to the customers. As they are eating, a customer realizes they need hot sauce. The customer moves a smartphone over a NFC tag on their table, and enters "need hot sauce" into the text box and pushes send. The message from the customers appears on the restaurant's message monitor application. All of the robots see the message, but only the closest robot accepts it, because all the robots do calculations as to which robot is closest to the table where the customer sent the message. Then the robot that accepted the message gets hot sauce and heads to the table to give the customers hot sauce. Eventually the customers finish eating and want to pay their bill, but no robot comes over. So a customer moves a smartphone over the NFC tag on their table, and enters "ready to pay" into the text box and pushes send. Then a robot comes over, takes payment, and the customers leave.

Another example of one embodiment of the invention, is as follows: customers walk into a grocery store. There are NFC tags prepared and placed in different parts of every aisle. The customers get a cart and go through the aisles and pick up items they want, and then put those items in their cart. At some point the customers have a question, so 1 of the customers moves a smartphone over a NFC tag that is positioned at some point in an aisle. This produces a prompt on the smartphone showing the business name of the grocery store, and a prompt saying "Message to staff" and a text box. The customers write their question into the text box and push send. The message from the customers appears on the grocery store's message monitor application. All of the staff sees the message, but only the closest staff person accepts it and heads to the service point (where the NFC tag is that the customer used to ask for help). The staff person arrives at the service point, answers the customers' question. Eventually the customers finish shopping and want to checkout, but no checkout lanes are open. So a customer moves a smartphone over the NFC tag nearest them, and enters "ready to pay" into the text box and pushes send. Then a staff person comes over, takes payment, and the customers leave.

Another example of one embodiment of the invention, is as follows: customers walk into a retail store. There are NFC tags prepared and placed in different parts of the store. The customers get a cart and go through the aisles and pick up items they want, and then put those items in their cart. At some point the customers have a question, so 1 of the customers moves a smartphone over a NFC tag that is positioned at some point in the store. This produces a prompt on the smartphone showing the business name of the retail store, and a prompt saying "Message to staff" and a text box.

The customers write their question into the text box and push send. The message from the customers appears on the retail store's message monitor application. All of the staff sees the message, but only the closest staff person accepts it and heads to the service point (where the NFC tag is that the customer used to ask for help). The staff person arrives at the service point, answers the customers' question. Eventually the customers finish shopping and want to checkout, but there is no want at the cash register. So a customer moves a smartphone over the NFC tag nearest them, and enters "ready to pay" into the text box and pushes send. Then a staff person comes over, takes payment, and the customers leave.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A system, comprising:
an administrator;
a business;
a business's location;
a business identification ("ID");
a service point, which is a place where a customer will receive service from the business;
wherein the administrator chooses a secret key;
wherein the administrator assigns the chosen secret key to a business by linking the secret key to the business's business ID in a database;
wherein the administrator prepares several Near field communication ("NFC") tags for the business by embedding the chosen secret key in each NFC tag;
wherein the prepared NFC tags only work for the business and no other;
wherein the prepared NFC tags are physically delivered to the business's location;
wherein service points in the business's location have identifying service point numbers;
wherein for each service point in the business's location, a worker scans a prepared NFC tag and a tag assignment application launches on a smartphone;
wherein the worker enters the business ID and service point number and submits the service point number;
wherein the prepared NFC tag is assigned to the service point;
wherein the prepared NFC tag is physically placed at the service point;
wherein a customer uses a smartphone to read the prepared NFC tag at the service point;
wherein a website pops up on the smartphone and the customer enters a request, which is sent to the workers at the business;
wherein the request is authenticated and hence physical presence of the customer at the service point is verified; and
wherein the workers receive the request; and
wherein one worker responds to the request at the service point from which the customer sent the request.

2. The system of claim 1,
wherein the NFC tags are secured.

3. The system of claim 1,
wherein the administrator prepares a few dozen Near field communication ("NFC") tags for the business by embedding the chosen secret key in each NFC tag.

4. The system of claim 1,
wherein the prepared NFC tags are secured, the customer's request is authenticated and hence physical presence of the customer at the service point is verified, by automatically injecting a dynamic authentication code into a URL of the website each time the prepared NFC tag is read;
wherein the dynamic authentication code is checked for verification in a cloud computing platform, and if correct, then the customer's request is displayed on a worker's display;
and wherein if the dynamic authentication code is found to be incorrect, then the customer's request is never displayed to the worker at the business.

5. The system of claim 1,
wherein the business is a grocery store;
and wherein there are 3 service points in each aisle of the grocery store, spread evenly across the aisle.

6. The system of claim 1,
wherein the business is a movie theater;
and wherein each service point is a seat in the movie theater.

7. The system of claim 1,
wherein the prepared NFC tags are secured, the customer's request is authenticated and hence physical presence of the customer at the service point is verified, by automatically injecting a dynamic authentication code into a URL of the website each time the prepared NFC tag is read;
wherein the dynamic authentication code is checked for verification in a cloud computing platform, and if correct, then the customer's request is displayed on the server's display;
wherein if the dynamic authentication code is found to be incorrect, then the request is never displayed to the worker at the business; and
wherein the administrator prepares a few dozen Near field communication ("NFC") tags for the business by embedding a chosen secret key in each NFC tag.

8. A system, comprising:
an administrator;
a business;
a business's location;
a business identification ("ID");
a portable computing device, that has a processor, memory, storage, and a user interface;
wherein the administrator chooses a secret key;
wherein the administrator assigns the chosen secret key to a business place by linking the secret key to the business place's business ID in a database;
wherein the administrator prepares several Near field communication ("NFC") tags for the business by embedding the chosen secret key in each NFC tag;
wherein the prepared NFC tags only work for the business and no other;
wherein the prepared NFC tags are physically delivered to the business's location;
wherein tables or seats in the business's location have identifying table or seat numbers;
wherein for each table or seat in the business's location, an artificial intelligence based robot scans a prepared NFC tag and a tag assignment application launches on a portable computing device;
wherein the artificial intelligence based robot enters the business ID and table or seat number and submits the table or seat number;
wherein the prepared NFC tag is assigned to table or seat;
wherein the prepared NFC tag is physically placed at the table or seat;
wherein a customer can uses a portable computing device to read the prepared NFC tag at a table or seat;
wherein a website pops up on the portable computing device and the customer enters a request, which is sent to artificial intelligence based robots at the business place;
wherein the customer's request is authenticated and hence physical presence of the customer at the table or seat is verified; and wherein the artificial intelligence based robots receives the request; and wherein one artificial intelligence based robot responds to the request.

9. The system of claim 8, wherein the NFC tags are secured.

10. The system of claim 8, wherein the administrator prepares a few dozen Near field communication ("NFC") tags for the business by embedding the chosen secret key in each NFC tag.

11. The system of claim 8, wherein the prepared NFC tag is secured, the customer's request is authenticated and hence physical presence of the customer at the service point is verified, by automatically injecting a dynamic authentication code into a URL of the website each time the prepared NFC tag is read;

wherein the dynamic authentication code is checked for verification in a cloud computing platform, and if correct, then the customer's request is displayed on a worker's display;

and wherein if the dynamic authentication code is found to be incorrect, then the customer's request is never displayed to the artificial intelligence based robots at the business.

12. The system of claim 8, wherein the prepared NFC tags are secured, the customer's request is authenticated and hence physical presence of the customer at the service point is verified, by automatically injecting a dynamic authentication code into a URL of the website each time the prepared NFC tag is read;

wherein the dynamic authentication code is checked for verification in a cloud computing platform, and if correct, then the request is displayed on the server's display;

wherein if the dynamic authentication code is found to be incorrect, then the customer's request is never displayed to the artificial intelligence based robots at the business; and wherein the administrator prepares a few dozen Near field communication ("NFC") tags for the business by embedding a chosen secret key in each NFC tag.

13. The system of claim 8, wherein the portable computing device is a smartphone.

14. The system of claim 8, wherein the portable computing device is any portable computing device that functions with NFC.

* * * * *